United States Patent
Filimonov et al.

(10) Patent No.: US 7,381,678 B2
(45) Date of Patent: Jun. 3, 2008

(54) HYDROCARBON CRACKING CATALYST USING CHEMICAL LIQUID DEPOSITION AND METHOD FOR PREPARING THE SAME

(75) Inventors: Igor N. Filimonov, Daejeon (KR); Sang-mun Jeong, Daejeon (KR); Won-ho Lee, Daejeon (KR); Jun-han Kang, Daejeon (KR); Jong-hun Song, Daejeon (KR)

(73) Assignees: LG Chem, Ltd., Seoul (KR); LG PetroChemical Co., Ltd., Yeosu-si (KR)

( * ) Notice: Subject to any disclaimer, the term of this patent is extended or adjusted under 35 U.S.C. 154(b) by 463 days.

(21) Appl. No.: 11/251,888

(22) Filed: Oct. 18, 2005

(65) Prior Publication Data

US 2006/0084568 A1   Apr. 20, 2006

(30) Foreign Application Priority Data

Oct. 18, 2004   (KR) .................. 10-2004-0083254

(51) Int. Cl.
*B01J 29/06* (2006.01)
(52) U.S. Cl. .......................... 502/73; 502/77
(58) Field of Classification Search ............... 502/73, 502/77
See application file for complete search history.

(56) References Cited

U.S. PATENT DOCUMENTS

| | | | |
|---|---|---|---|
| 3,644,557 A | | 2/1972 | Senes et al. |
| 3,875,081 A | * | 4/1975 | Young .................... 502/74 |
| 3,969,542 A | | 7/1976 | Tomita et al. |
| 4,111,793 A | | 9/1978 | Kolombos et al. |
| 5,053,372 A | * | 10/1991 | Brownscombe .......... 502/60 |
| 5,146,034 A | | 9/1992 | Morales et al. |
| 5,600,051 A | | 2/1997 | Baker et al. |
| 5,968,342 A | | 10/1999 | Tsunoda et al. |

FOREIGN PATENT DOCUMENTS

| | | |
|---|---|---|
| EP | 0 212 320 | 10/1991 |
| JP | 11253807 | 9/1999 |
| JP | 11255674 | 9/1999 |

* cited by examiner

*Primary Examiner*—Elizabeth D. Wood
(74) *Attorney, Agent, or Firm*—McKenna Long & Aldridge LLP

(57) ABSTRACT

The present invention relates to a hydrocarbon cracking catalyst and a method for preparing the same. The invention provides a hydrocarbon cracking catalyst in which a metal or a metal oxide is deposited only on the surface of zeolite and a method for preparing the hydrocarbon cracking catalyst comprising the steps of: a) dissolving a metal-hydrocarbon complex or an organometal larger than the pore size of a zeolite carrier; b) depositing the resultant solution on the zeolite surface; and c) drying and calcining the resultant zeolite catalyst. The hydrocarbon cracking catalyst of the invention can greatly improve production yield of olefins and aromatic compounds such as BTX.

8 Claims, 2 Drawing Sheets

Chemical Liquid Deposition

Metal Impregnation Method

HYDROCARBON CRACKING CATALYST USING CHEMICAL LIQUID DEPOSITION AND METHOD FOR PREPARING THE SAME

This application claims the benefit of Korean Patent Application No. 10-2004-0083254, filed on Oct. 18, 2004, in the Korean Intellectual Property Office, the disclosure of which is incorporated herein by reference.

TECHNICAL FIELD

The present invention relates to a hydrocarbon cracking catalyst and a method for preparing the same. More particularly, it relates to a hydrocarbon cracking catalyst capable of cracking hydrocarbons in the presence of steam in preparing such olefins as ethylene and propylene and such aromatic compounds as BTX and offering better preparation yield than thermal cracking, and a method for preparing the same.

BACKGROUND ART

Ethylene, propylene and BTX are important basic materials in producing petrochemical products. Ethylene and propylene are typically produced by steam thermal cracking of hydrocarbons mainly consisting of such paraffinic compounds as natural gas, naphtha and gas oil at a temperature of at least 800° C. in the absence of a catalyst. BTX is obtained as byproduct in this high-temperature thermal cracking. In order to improve yield of ethylene and propylene in steam thermal cracking of hydrocarbons, it is necessary to increase transition rate of hydrocarbon or selectivity of olefins. However, pure steam thermal cracking is limited in increasing transition rate of hydrocarbon or selectivity of olefins. Thus, a variety of methods have been proposed in order to increase production yield of olefins.

Methods of using catalysts in steam thermal cracking of hydrocarbons were proposed to improve yield of ethylene and propylene. U.S. Pat. No. 3,644,557 disclosed a catalyst comprising magnesium oxide and zirconium oxide. U.S. Pat. No. 3,969,542 disclosed a catalyst comprising calcium aluminate as basic component. U.S. Pat. No. 4,111,793 disclosed a manganese oxide catalyst supported on zirconium oxide. European Patent Publication No. 0212320 disclosed an iron catalyst supported on magnesium oxide. And, U.S. Pat. No. 5,600,051 disclosed a catalyst comprising barium oxide, alumina and silica. However, since these catalysts require high temperature for the steam thermal cracking of hydrocarbons, coking of the catalyst is severe.

U.S. Pat. No. 5,146,034 obtained olefins in high yield from low paraffinic hydrocarbons like propane using a ZSM-5 zeolite catalyst modified with a group 1A modifier. U.S. Pat. No. 5,968,342 disclosed a method of preparing ethylene and propylene in high yield using a ZSM-5 zeolite catalyst modified by an alkaline earth metal ion. There are many other patents using zeolite-based hydrocarbon cracking catalysts. Particularly, Japanese Patent Publication Nos. 11-253807 and 11-255674 disclosed a ZSM-5 catalyst modified by a rare earth metal element for increasing selectivity of olefins and a method for preparing olefins using n-butane. These patents are characteristic in that yield of low olefins is increased while minimizing production of aromatic hydrocarbon byproducts. However, they are disadvantageous in that yield of BTX is very low because the rare earth metal element used to modify the zeolite is present not only on the surface of the zeolite but also inside the pores, since a salt containing the rare earth metal element is used as precursor.

Until now, hydrocarbon cracking catalysts were mainly prepared by impregnation method or ion exchange method. When metal is added to the resultant zeolite catalysts, it tends to be present inside the pores of the zeolite, thereby greatly affecting inherent acidity of the zeolite.

In the conventional metal impregnation method, such salts as nitrate and sulfate are as used as metal precursor and water, alcohol, etc. are used as solvent (see FIG. 2). Thus, the metal component is present in the as ion precursor solution. The metal ion penetrates into the pores of ZSM-5 and exists not only on the surface of ZSM-5 but also inside the pores, after calcining. The resultant catalyst has significantly reduced acidity and thus has poor hydrocarbon cracking activity.

In hydrocarbon cracking using MFI type zeolites like ZSM-5, yield of BTX tends to be low when yield of olefins such as ethylene and propylene is high, and vice versa. This is because the product distribution is closely related with strength and amount of acid sites of the ZSM-5 catalyst. In order to maximize product value in hydrocarbon cracking, a catalyst capable of increasing yield of BTX as well as that of olefins is required.

DISCLOSURE OF INVENTION

The present invention was made in consideration with these problems and was completed by realizing that reaction temperature of hydrocarbon thermal cracking can be significantly reduced and yield of such valuable compounds as olefins and BTX can be increased by depositing rare earth metal on the surface of a ZSM-5 zeolite catalyst.

It is an object of the invention to provide a hydrocarbon cracking catalyst offering olefins, such as ethylene and propylene, and BTX in high yield when preparing them by cracking hydrocarbons and a method for preparing the same.

The above-mentioned object and other objects can be attained by the present invention as described herein below.

To attain the objects, the present invention provides a hydrocarbon cracking catalyst in which a metal or a metal oxide selected from the group consisting of a rare earth metal, an oxide thereof, an alkaline earth metal and an oxide thereof is deposited only on the surface, not present inside the pores of zeolite.

The invention also provides a method for preparing a hydrocarbon cracking catalyst comprising the steps of:

a) dissolving a metal-hydrocarbon complex or an organometal larger than the pore size of a zeolite carrier in an organic solvent;

b) depositing the resultant solution on the surface of zeolite; and c) drying and calcining the resultant zeolite catalyst.

To take the case of using lanthanum, a metal-hydrocarbon complex or an organometal, such as lanthanum (III) 2-ethylhexanoate, which is bulky and has a large molecular weight, is used instead of a salt like lanthanum nitrate. The metal component is deposited on the zeolite surface only by chemical solution deposition, leaving no metal component inside the pores of zeolite.

Hereinafter, the present invention is described in further detail.

The present invention is characterized by a catalyst for hydrocarbon thermal cracking in which the catalytic metal oxide is deposited only on the surface of zeolite. Rare earth metal, alkali metal or alkaline earth metal component is deposited only on the surface of a zeolite catalyst, which enables cracking of hydrocarbon at low temperature, by chemical solution deposition. The advantage of this preparation method is that oligomerization and polymerization at the acid sites of the zeolite surface can be avoided without affecting hydrocarbon cracking inside the micropores of zeolite. FIG. 1 is a schematic diagram of the catalyst preparation process by chemical solution deposition.

The process comprises the steps of:
a) dissolving an organometal in an organic solvent;
b) depositing the resultant solution on the surface of zeolite; and
c) drying and calcining the resultant zeolite catalyst.

Preferably, the zeolite may be ZSM-5.

In the chemical solution deposition, an organometallic compound larger than the pore size of ZSM-5 is used as precursor. An organic solvent such as hexane is used to dissolve the precursor. In the catalyst prepared by chemical solution deposition, the metal component is present only on the surface of the ZSM-5 catalyst, as seen in FIG. 1. Thus, acid sites on the catalyst surface are occupied by the metal components, but those at the pores of the catalyst remain intact. Accordingly, yield of olefins and BTX can be increased due to improved hydrocarbon cracking activity and prevention of polymerization on the catalyst surface.

The resultant hydrocarbon cracking catalyst can be prepared to adequate shape and size as admixed with a binder. The metal component includes a rare earth metal, an alkali metal or an alkaline earth metal. More specifically, it may be La, Ce, Pr, Ca, Mg, Sr or Ba etc. The hydrocarbon used to deposit these metals on the zeolite surface by chemical solution deposition may be a $C_4$-$C_{10}$, preferably $C_4$-$C_8$, paraffinic, olefinic or an aromatic compound. For example, lanthanum (III) 2-ethylhexanoate, calcium 2-ethylhexanoate, barium 2-ethylhexanoate, cerium 2-ethylhexanoate, strontium cyclohexane butylate, magnesium myristate, yttrium 2-ethylhexanoate, etc. may be used. Besides, metal-hydrocarbon complexes having so large a molecular weight that they cannot penetrate into the pores of ZSM-5 can be used.

Zeolite is a crystalline, microporous molecular sieve comprising lattice type silica and alumina bonded with exchangeable cations like ions of alkali metal or alkaline earth metal. Typically, synthetic zeolite is prepared from zeolite crystallization of a supersaturated synthetic mixture. The resultant crystal is dried and calcined to obtain zeolite powder. The resultant zeolite can be modified by exchanging the cation with metal, impregnating metal in the pores of the zeolite or adjusting the concentration of alumina in the lattice, in order to change reactivity of the zeolite.

The zeolite, which is used as carrier in the catalyst of the present invention, has an average pore size of about 5-7 Å and a proportion of $SiO_2/Al_2O_3$ of at least 10, preferably 15-200. It has a crystal structure such as MFI, MEL, TPN, MTT and FER. Most preferably, ZSM-5, a molecular sieve, is used in the present invention. ZSM-5 has cations of alkali metal or alkaline earth metal. It is ion-exchanged with ammonium cations and then calcined at a temperature of 300-600° C. Preferably, HZSM-5, which is prepared by the technique well known in the art, is employed in the present invention as carrier.

The metal component supported on the zeolite is a rare earth metal, an alkali metal or an alkaline earth metal. Preferably, it is deposited on the zeolite surface in the range from 0.1 to 20 wt % based on the weight of the carrier. If the deposition amount is below 0.1 wt %, catalytic activity is insufficient. Otherwise, if it exceeds 20 wt %, the metal component covers the openings of the pores, as well as the zeolite surface, thereby greatly reducing catalytic activity.

The process of preparing the catalyst of the present invention is as follows.

First, an organometal is dissolved in an organic solvent and agitated at room temperature for 1 hour. A wanted amount of HZSM-5 is put in a chamber and the resultant solution is slowly dropped on HZSM-5 using a pipette or the like. The chamber is closed so that the solution is not vaporized and kept at room temperature for at least 6 hours. The chamber is opened to evaporate the solution. The resultant catalyst is dried and calcined.

The resultant hydrocarbon thermal cracking catalyst can be used in such reactors as fixed-bed reactor, fluid-bed reactor and moving-bed reactor.

BEST MODES FOR CARRYING OUT THE INVENTION

Hereinafter, the present invention is described in more detail through examples. However, the following examples are only for the understanding of the present invention and the present invention is not limited to or by them.

Example 1

Metallic lanthanum (La), a rare earth metal, was deposited on the surface of an HZSM-5 carrier having a $SiO_2/Al_2O_3$ ratio of 30 by chemical solution deposition. For this purpose, a solution in which lanthanum (III) 2-ethylhexanoate was dissolved in hexane was agitated for 1 hour at room temperature. The HZSM-5 carrier was put in a chamber. The solution prepared above was slowly dropped on the HZSM-5 carrier using a pipette, so that the weight of La became 5 wt % of the weight of the HZSM-5 carrier. Then, the chamber was closed and kept at room temperature for 12 hours. The chamber was opened to evaporate the solvent. The resultant catalyst was dried in an oven at 120° C. for 2 hours and calcined under air atmosphere at 600° C.

Comparative Example 1

AN HZSM-5 carrier having a $SiO_2/Al_2O_3$ ratio of 30 with no metallic La deposited was used.

Comparative Example 2

Metallic La was deposited on an HZSM-5 carrier having a $SiO_2/Al_2O_3$ ratio of 30 by impregnation. For this purpose, an HZSM-5 carrier was immersed in a solution in which $La(NO_3)_3 \cdot 6H_2O$ was dissolved in distilled water, so that the weight of La became 5 wt % of the weight of the HZSM-5 carrier. Water was evaporated from the solution containing the HZSM-5 carrier using a vacuum evaporation drier. The resultant catalyst was dried in an oven at 120° C. for 2 hours and calcined under air atmosphere at 600° C.

Ammonia TPD (temperature programmed desorption) test was performed to evaluate acid sites of the catalysts of Example 1 and Comparative Examples 1 and 2. About 0.1 g of catalyst was put in a quartz reactor and pre-treated by heating to 500° C. under helium atmosphere of 20 cc/min. After cooling to room temperature, $NH_3$ was adsorbed using 2.02% $NH_3$/He balance at 20 cc/min for 1 hour while maintaining the temperature. After replacing the gas with He, the temperature was increased to 100° C. to remove the physically adsorbed $NH_3$. Desorption of $NH_3$ was performed using a He gas of 20 cc/min while increasing the temperature to 800° C. at a rate of 10° C./min. The desorbed gas was analyzed and quantified by TCD.

Figure 3:
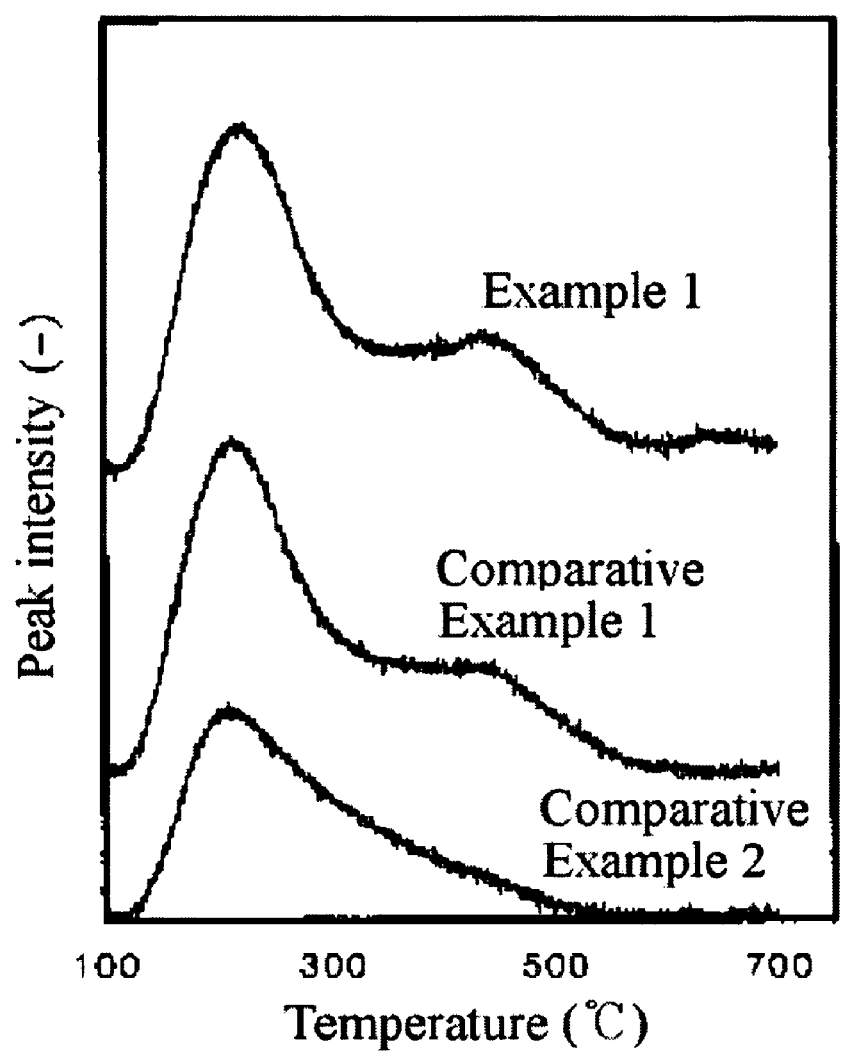
FIG. 3 is a graph comparing acid sites of the catalysts according to an embodiment and comparative examples of the present invention.

The TPD result for Example 1 and Comparative Examples 1 and 2 are shown in FIG. 3. As seen in FIG. 3, HZSM-5, or the mother catalyst, showed weak acid sites at around 220° C. and strong acid sites at around 450° C. (Comparative Example 1). The catalyst of Example 1 showed acid sites similar to those of HZSM-5. On the other hand, the catalyst prepared by the conventional impregnation method (Comparative Example 2) showed slightly reduced weak acid sites and significantly reduced strong acid sites compared with those of Comparative Example 1 and Example 1. That is, even if the same amount of metal component deposited, the property of the catalyst changes greatly depending on the method of deposition. Using chemical solution depositions in Example 1, the catalyst can be effectively modified by the metal component while maintaining inherent acid sites of zeolite.

Surface area of the catalysts prepared in Example 1 and Comparative Examples 1 and 2 measured by $N_2$ adsorption is given in Table 1 below.

TABLE 1

|  | Example 1 | Comparative Example 1 | Comparative Example 2 |
|---|---|---|---|
| Surface area (m²/g) | 394 | 425 | 348 |

As seen in Table 1, the catalyst prepared by chemical solution deposition (Example 1) has a surface area slightly smaller than that of pure HZSM-5 (Comparative Example 1). However, the catalyst prepared by impregnation (Comparative Example 2) has a surface area significantly smaller than those of Comparative Example 1 and Example 1. It is because, for chemical solution deposition, metallic La is present only on the surface of the catalyst and does not block the micropores of HZSM-5, as described above. On the other hand, for the catalyst prepared by impregnation (Comparative Example 2), metallic La penetrates into the pores of HZSM-5 and blocks them, thereby greatly reducing the surface area. Comparison of surface area shows that the catalyst has a significantly different structure even when the same metal component is added to HZSM-5, depending upon the preparation method.

Experimental Example 1

Hydrocarbon cracking was performed using the catalyst prepared in Example 1. Naphtha was cracked as follows. A quartz tube having an outer diameter of ½" was filled 0.5 g of the catalyst. Reaction temperature was maintained at 650° C. Naphtha and water were injected into the tube using syringe pumps at a rate of 7.5 mL/hr and 2.5 mL/hr, respectively, so that when they reach the tube they could contact the catalyst layer as vaporized. Cracking product leaving the reactor was quantitatively analyzed by gas chromatography. The result is given in Table 2 below.

Yield of the product was calculated by Equation 1 below.

$$\text{Yield of product (wt \%)} = \text{Weight of product/Weight of naphtha} \times 100 \qquad [\text{Equation 1}]$$

Experimental Example 2

Metallic calcium, an alkaline earth metal, was deposited on the surface of an HZSM-5 carrier having an $SiO_2/Al_2O_3$ ratio of 30 by chemical solution deposition. For this purpose, a solution in which lanthanum (III) 2-ethylhexanoate was dissolved in hexane was agitated for 1 hour at room temperature. The HZSM-5 carrier was put in a chamber. The solution prepared above was slowly dropped on the HZSM-5 carrier using a pipette, so that the weight of Ca became 5 wt % of the weight of the HZSM-5 carrier. Then, the chamber was closed and kept at room temperature for 12 hours. The chamber was opened to evaporate the solvent. The resultant catalyst was dried in an oven at 120° C. for 2 hours. Naphtha was cracked using the resultant catalyst in the same manner of Experimental Example 1.

Experimental Example 3

Naphtha was cracked in the same manner of Experimental Example 1 except that an HZSM-5 catalyst having an $SiO_2/Al_2O_3$ ratio of 30 was used.

Experimental Example 4

Naphtha was cracked in the same manner of Experimental Example 1 except that a La/HZSM-5 catalyst (La content=5 wt %) prepared by impregnation was used as catalyst.

TABLE 2

| Category | Experimental Example 1 | Experimental Example 2 | Experimental Example 3 | Experimental Example 4 |
|---|---|---|---|---|
| Catalyst | 5 wt % La/HZSM-5 (chemical solution deposition) | 5 wt % Ca/HZSM-5 (chemical solution deposition) | HZSM-5 | 5 wt % La/HZSM-5 (impregnation) |
| Reaction temperature (° C.) | 650 | 650 | 650 | 650 |
| Yield of ethylene (wt %) | 27.0 | 26.7 | 24.6 | 18.6 |
| Yield of propylene (wt %) | 21.2 | 22.9 | 24.1 | 25.3 |
| Yield of BTX (wt %) | 18.1 | 14.5 | 12.1 | 10.3 |
| Yield of ethylene + propylene + BTX (wt %) | 66.3 | 64.1 | 60.8 | 54.2 |

Figure 1:
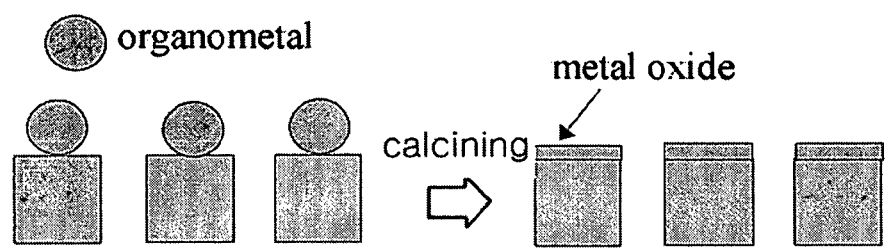
FIG. 1 is a schematic diagram showing the process of preparing a hydrocarbon cracking catalyst by chemical solution deposition according to an embodiment of the present invention.
Figure 2:
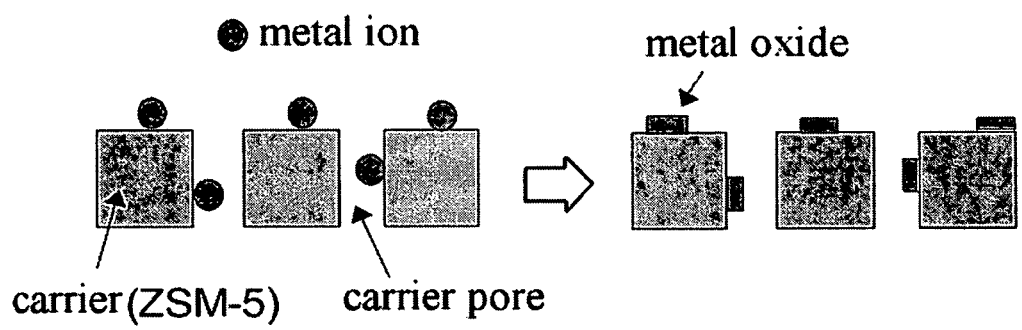
FIG. 2 is a schematic diagram showing the process of preparing a hydrocarbon cracking catalyst by metal supporting method according to a comparative example of the invention.

As seen in Table 2, naphtha cracking was performed using only the HZSM-5 catalyst at 650° C. (Experimental Example 3), yield of ethylene plus propylene was about 48.7 wt %. Yield of BTX was about 12.1 wt %. Yield of the three products was 60.8 wt %. When the HZSM-5 catalyst in which La was deposited at the surface by chemical solution deposition (Experimental Example 1) was used, yield of BTX increased to 18.1 wt %. Yield of ethylene+propylene+BTX was 66.3 wt %, larger than the case of using HZSM-5 only. When the HZSM-5 catalyst in which Ca was deposited at the surface (Experimental Example 2) was used, yield of ethylene and BTX was larger than that of Experimental Example 3. Yield of ethylene+propylene+BTX was 64.1 wt %, larger than that of Experimental Example 3. On the other hand, when the catalyst in which metallic La was impregnated (Experimental Example 4) is used, yield of the products was smaller than that of Experimental Example 3. It is because the metal component penetrates into the pores of HZSM-5 and reduces acid sites (see FIG. 2).

In short, if the metal component is deposited only on the surface of HZSM-5 without penetrating into its pores, yield of olefins and BTX can be increased significantly in cracking of hydrocarbons. Although La and Ca were proposed as examples of rare earth metal and alkaline earth metal, respectively, other rare earth metals and alkaline earth metals can be employed in the present invention. Although a fixed-bed reactor was used in the embodiment of the invention for comparison of catalytic activity, a fluid-bed reactor and a moving-bed reactor may be used in the industrial process, as well as a fixed-bed reactor. Although ethylhexanoate containing a metal component was used as precursor in the embodiment of the invention, other bulky molecules such as alkylhexanoate, which cannot penetrate into the pores of zeolite, may be used.

The catalyst of the present invention can be used in pure powder form or as extruded into pellet form. In the latter case, a binder may be added to offer an adequate strength.

INDUSTRIAL APPLICABILITY

As described above, while the conventional zeolite catalyst shows poor reaction activity in hydrocarbon cracking because the metal component is present in the pores of the zeolite, the hydrocarbon cracking catalyst of the present invention has superior reaction activity and significantly increases production yield of olefins and BTX because the metal component exists only on the surface of the zeolite. Accordingly, the catalyst of the present invention can maximize economic effect in hydrocarbon cracking, since production yield of olefins such as ethylene and propylene aromatic compounds such as BTX is improved significantly.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A hydrocarbon cracking catalyst in which a metal or a metal oxide selected from the group consisting of a rare earth metal, an oxide thereof, an alkaline earth metal and an oxide thereof is deposited only on the surface of zeolite, not present in the pores of the zeolite.

2. The hydrocarbon cracking catalyst of claim 1 in which the metal or metal oxide is deposited in the range of 0.1-20 wt % based on the weight of the carrier.

3. The hydrocarbon cracking catalyst of claim 1 in which the zeolite has a crystal structure of MFI, MEL, TPN, MTT or FER.

4. The hydrocarbon cracking catalyst of claim 1 in which the zeolite is HZSM-5 having an $SiO_2/Al_2O_3$ ratio of 15-200.

5. The hydrocarbon cracking catalyst of claim 1 in which the rare earth metal is selected from the group consisting of La, Ce and Pr and the alkaline earth metal is selected from the group consisting of Mg, Ca, Sr and Ba.

6. A method for preparing a hydrocarbon cracking catalyst comprising the steps of:
   a) dissolving a metal-hydrocarbon complex or an organometal larger than the pore size of a zeolite carrier in an organic solvent;
   b) depositing the resultant solution on the surface of zeolite; and
   c) drying and calcining the resultant zeolite catalyst.

7. The method of claim 6 in which the hydrocarbon is selected from the group consisting of $C_4$-$C_{10}$ paraffinic, olefinic and aromatic hydrocarbons.

8. The method of claim 6 in which the metal-hydrocarbon complex or organometal is a complex of a rare earth metal or an alkaline earth metal and a hydrocarbon selected from the group consisting of lanthanum (III) 2-ethylhexanoate, calcium 2-ethylhexanoate, barium 2-ethylhexanoate, cerium 2-ethylhexanoate, yttrium 2-ethylhexanoate, strontium cyclohexane butylate and magnesium myristate.

* * * * *